April 17, 1934.   J. J. GONSOR   1,955,122
DEHAIRING MACHINE
Filed July 28, 1932   5 Sheets-Sheet 1

John J. Gonsor
INVENTOR

WITNESS

BY
ATTORNEY

April 17, 1934. J. J. GONSOR 1,955,122

DEHAIRING MACHINE

Filed July 28, 1932 5 Sheets-Sheet 2

John J. Gonsor
INVENTOR

WITNESS

BY
ATTORNEY

April 17, 1934.   J. J. GONSOR   1,955,122
DEHAIRING MACHINE
Filed July 28, 1932   5 Sheets-Sheet 3

John J. Gonsor
INVENTOR

WITNESS

BY
ATTORNEY

April 17, 1934.    J. J. GONSOR    1,955,122
DEHAIRING MACHINE
Filed July 28, 1932    5 Sheets-Sheet 4

WITNESS

John J. Gonsor
INVENTOR

BY
ATTORNEY

Patented Apr. 17, 1934

1,955,122

UNITED STATES PATENT OFFICE 1,955,122

DEHAIRING MACHINE

John J. Gonsor, Chicago, Ill., assignor to Industrial Patents Corporation, Chicago, Ill., a corporation of Delaware Application July 28, 1932, Serial No. 625,289

18 Claims. (Cl. 17—18)

The invention relates to a dehairing machine.

The object of the present invention is to improve the construction of dehairing machines and to provide a simple, practical and efficient dehairing machine unit of strong, durable and comparatively inexpensive construction in which the beaters which carry the knives, and means for mounting the beaters, will be constructed entirely of metal so as to eliminate completely the necessity of frequent renewal of the beaters as is required in dehairing machines in which the small knives are mounted on flexible arms or belts made of canvas, leather or similar material.

A further object of the invention is to provide a rotary dehairing unit of this character equipped with blade carrying beaters adapted to swing outwardly by centrifugal force and connected with one another to move in unison so that the centrifugal force of the beaters not in contact with the carcass will operate to assist in holding the carcass engaging beaters against the carcass with an effective pressure whereby the dehairing is accomplished in a minimum amount of time and with a higher degree of efficiency than heretofore.

It is also an object of the invention to provide a rotary dehairing unit equipped with knife carrying beaters capable of both an oscillatory and endwise movement to exert both a beating action and a scraping action on a carcass.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Figure 1:
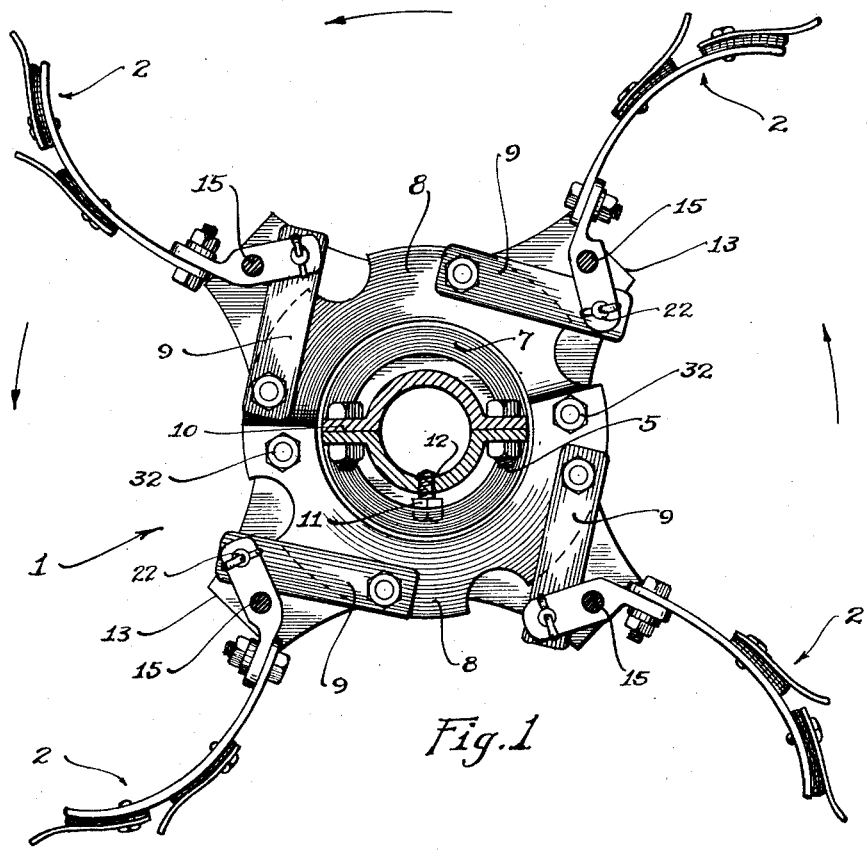
Figure 1 is a vertical sectional view of a rotary unit for dehairing machines constructed in accordance with this invention.
Figure 2:
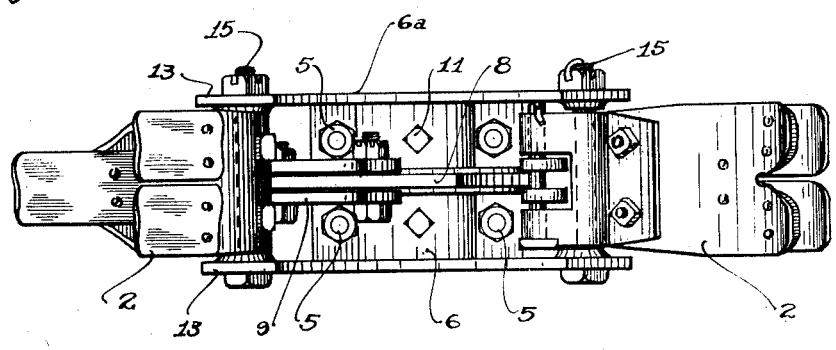
Fig. 2 is a plan view of the same.

In the accompanying drawings in which is illustrated the preferred embodiment of the invention the rotary dehairing unit comprises in its construction a rotary carrier 1 having mounted on it pivoted beaters 2 and consisting of a drum composed of two separable sections 3 which are secured on the shaft 4 by bolts 5 or other suitable fastening devices. The rotary carrier consists of a central hub 6 and side flanges 6a and it is provided with a central annual bearing flange 7 receiving a connecting ring 8 which is connected by links 9 with the beaters 2.

Each section 3 of the rotary carrier is provided with transverse webs 10 formed integral with the hub portion, the side flanges and the central bearing flange and which extend across the spaces between the central bearing flange and the side flanges.

The webs 10 are arranged in abutting relation and present flat faces to each other and are pierced by the bolts 5 which securely fasten the sections of the rotary carrier together. The hub is firmly clamped to the shaft by screws 11 threaded into openings 12 in one of the sections 3 of the rotary carrier and engaging the shaft 4. The clamping screws 11 are preferably provided with square heads adapted to be engaged by a wrench or other tool. Any other suitable means, however, may be provided for fixing the rotary carrier to the shaft 4.

The sides or flanges of the drum of the rotary carrier are provided at diametrically opposite points with extensions 13 having aligned openings 14 for the reception of transverse pivots 15 upon which the beaters are mounted. The pivots 15 preferably consist of bolts, but any other form of pivot may, of course, be employed. The sides or flanges 6a of the drum of the rotary carrier are preferably provided with openings 16 to lighten the construction.

Figure 4:
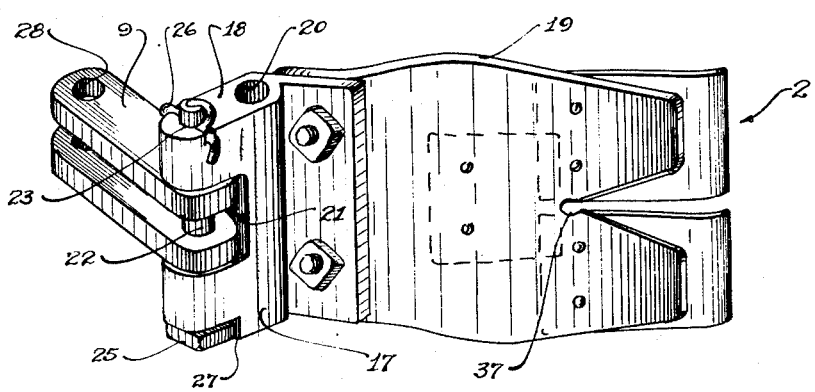
Fig. 4 is a detail perspective view of one of the beaters.
Figure 5:
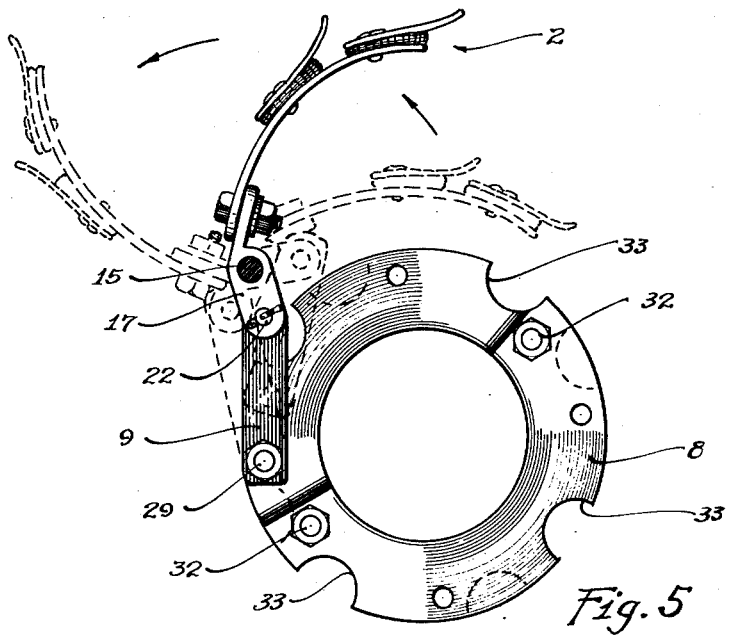
Fig. 5 is a detail view of the connecting ring and one of the beaters, the latter being shown in dotted lines at the limit of its inward and outward movements and in full lines in an intermediate position.

The beaters are pivoted intermediate of their ends to form relatively short inner arms 17 which are arranged at an angle to the outer portions of the beaters. The beaters preferably consist of angle castings 18 and curved plates 19 of resilient material. The angle casting 18 which is provided at its angle with a bearing opening 20 consists of a thickened inner portion which constitutes the arm 18 and which is bifurcated to provide a recess 21 to receive a pair of the links 9 which are located at opposite sides of the connecting ring 8. The links 9 are connected at their outer ends to the arm 18 by a transverse pivot 22 which passes through aligned openings 23 located at opposite sides of the recess 21, as clearly illustrated in Fig. 4 of the drawings. The bearing opening 20 receives the bolt 15 which pivots the beater between the extensions 13 of the sides or flanges of the rotary carrier. The pivot 22 may be of any desired construction and as illustrated in Fig. 4 of the drawings, it is provided at one end with a square head 25 and at the other end with a key 26, the arm 18 being provided with a recess 27 in one of its side faces to receive the head 25 of the pivot 22. The inner ends of the links are provided with aligned openings 28 through which passes a bolt 29 which also pierces the connecting ring 8 and pivotally connects the links 9 to the said ring.

The central annular flange of the rotary carrier forms a bearing for the connecting ring 8 which is sectional and which has overlapped ends 30 and 31 secured together by bolts 32.

The ends 31 of one of the sections are laterally offset to permit the two sections of the connecting ring to be arranged in the same plane and partially rotate on the bearing formed by the annular flange 7. One or both of the terminals of the sections of the connecting ring may, of course, be offset to enable the body portions of the sections of the bearing ring to lie in the same plane. The bearing ring is also provided at intervals in its periphery with segmental recesses 33 to receive the pivots 22 and permit the same to clear the connecting ring in the oscillatory movements of the beaters.

Figures 6, 7, 8:
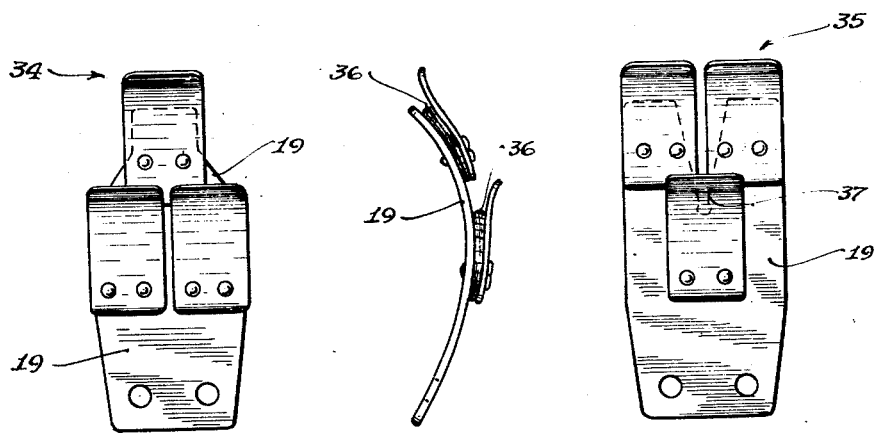
Fig. 6 is a detail view of the resilient outer portion of one of the beaters illustrating the arrangement of a central outer scraping knife and a pair of inner scraping knives.
Fig. 7 is a similar view illustrating the arrangement of a pair of outer scraping knives and the single inner centrally arranged knife.
Fig. 8 is an edge view of the same.
Figure 9:
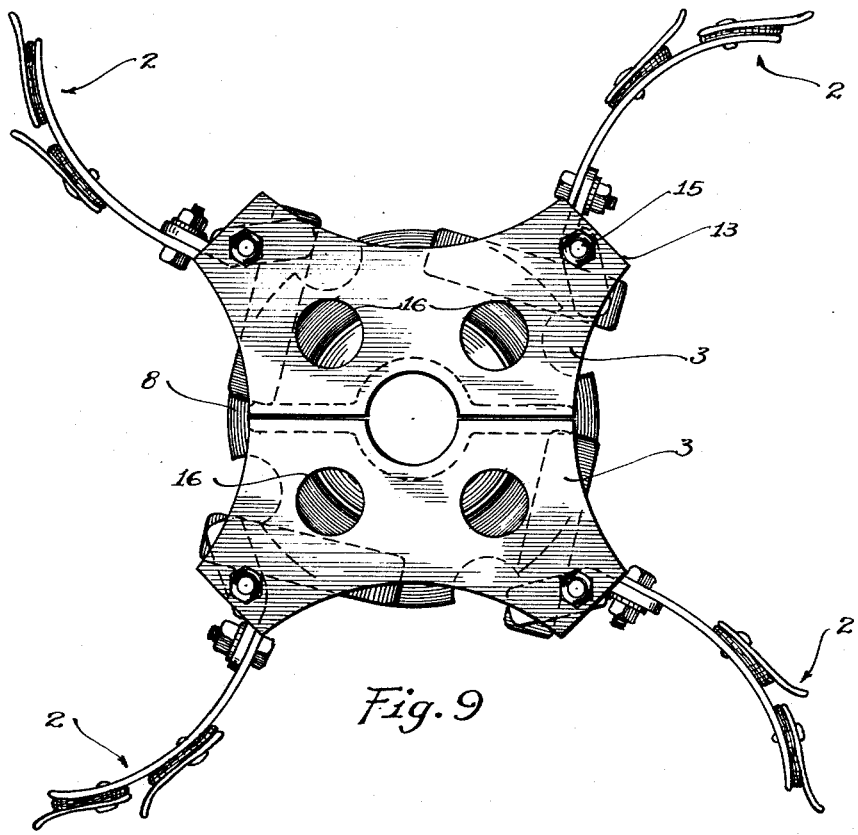
Fig. 9 is a side elevation of the rotary dehairing unit.
Figures 10, 11:
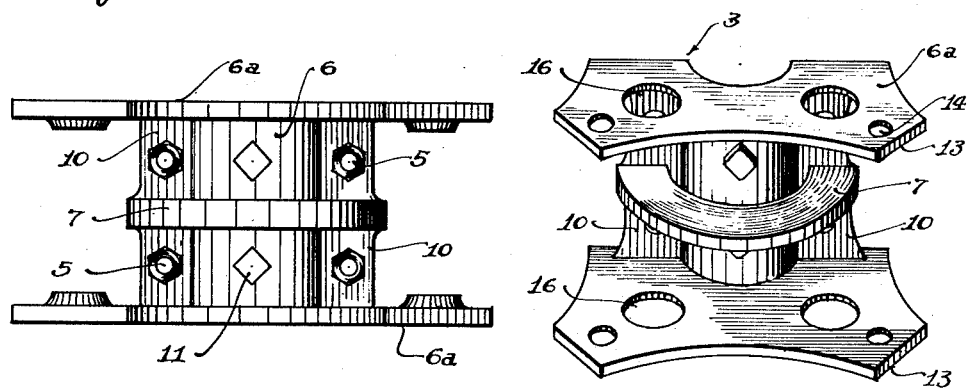
Fig. 10 is a plan view of the rotary carrier or drum.
Fig. 11 is a detail perspective view of one of the sections thereof.

The curved plates 2 which constitute the body portions of the beaters present convex surfaces to the carcass and they are equipped at their convex faces with scraper blades 34 and 35 of resilient material riveted or otherwise secured at their inner ends to the plates 19 and having their outer ends curved outwardly for engaging and dehairing a carcass. Shims 36 are preferably interposed between the blades and the plate 19. These shims may consist of rubber cushions, but any suitable material may be employed in the construction of the shims and the outer curved or slightly hook-shaped portions of the scraper blades extend beyond the shims, as clearly illustrated in the drawings. The scraper blades 35 are relatively narrow and are arranged in pairs, while the scraper blades 34 are relatively wide and may be arranged with either a single blade 34 at the outer end of the plate 19 and a pair of blades at the intermediate portion thereof, as illustrated in Figs 6 and 12 of the drawings, or with a pair of the blades 34 at the outer end of the plate 19 and a single blade 34 at the intermediate portion of the plate 19, as illustrated in Fig. 7 of the drawings.

Figure 12:
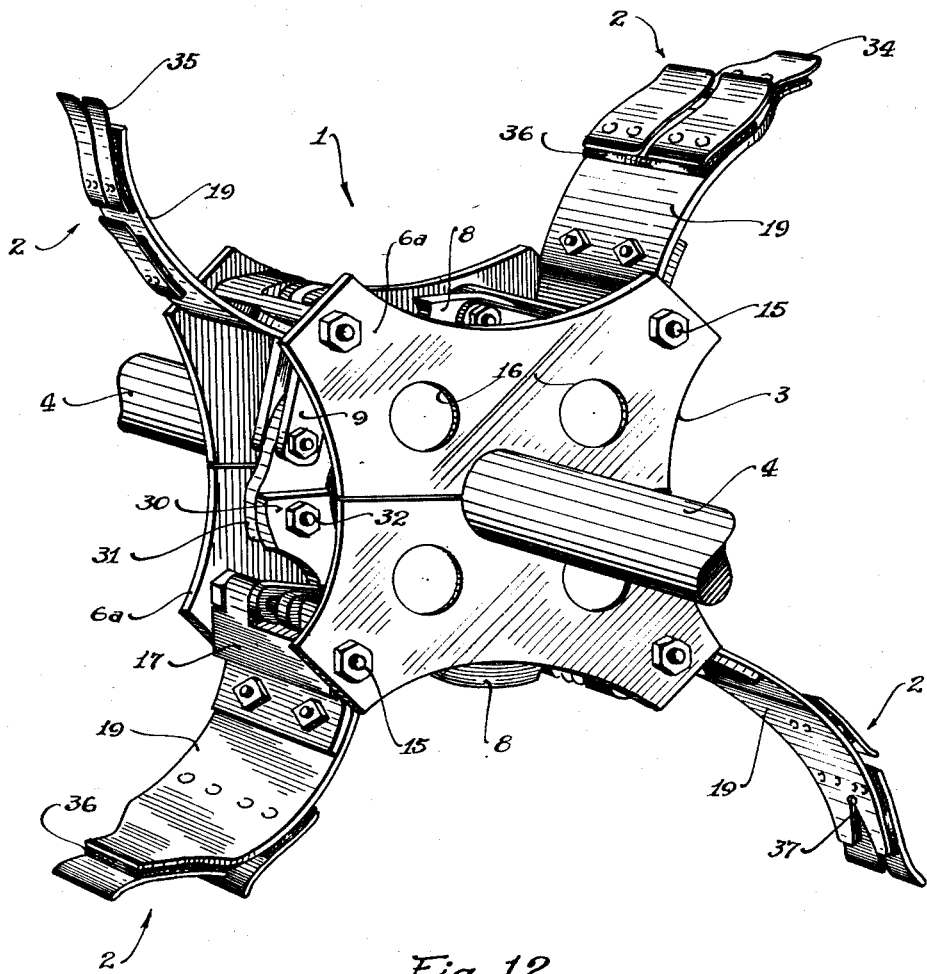
Fig. 12 is a perspective view of the rotary dehairing unit illustrating a plurality of types and arrangements of the scraping knives.

When a pair of blades is arranged at the outer end of the plate 19 the latter is preferably provided with a terminal recess 37 which is preferably tapered inwardly as clearly illustrated in Fig. 12 of the drawings.

The beaters operate through centrifugal force when the shaft 4 is rotated, exerting both a beating and a scraping action on the carcass. The beaters not in contact with the carcass, being connected with the other beaters by the connecting ring, operate through centrifugal force to press the carcass engaging beaters against the carcass. Consequently the beaters have both a beating and a scraping action and maintain an efficient pressure against the carcass so that dehairing is accomplished in a minimum amount of time and with higher efficiency than is possible with beaters operating independently of one another. The dehairing unit rotates in the direction of the arrows in Fig. 3 of the drawings and through centrifugal force swing outwardly and first engage the carcass when practically at the limit of their outward movement and they are gradually forced inwardly through contact with the carcass and exert the said beating and scraping action on the same. In the rotary movement of the carrier the beaters assume various positions between the limits of their inward and outward movements as indicated in the drawings. When the beaters move inwardly and outwardly the connecting ring to which the inner ends of the links 9 are pivoted rotates on the central bearing of the rotary carrier and permits such inward and outward movement of the beaters while securing a substantially uniform movement of the same and a combined application of a centrifugal force of the beaters in maintaining an efficient pressure on the beaters in contact with the carcass being dehaired.

Figure 3:
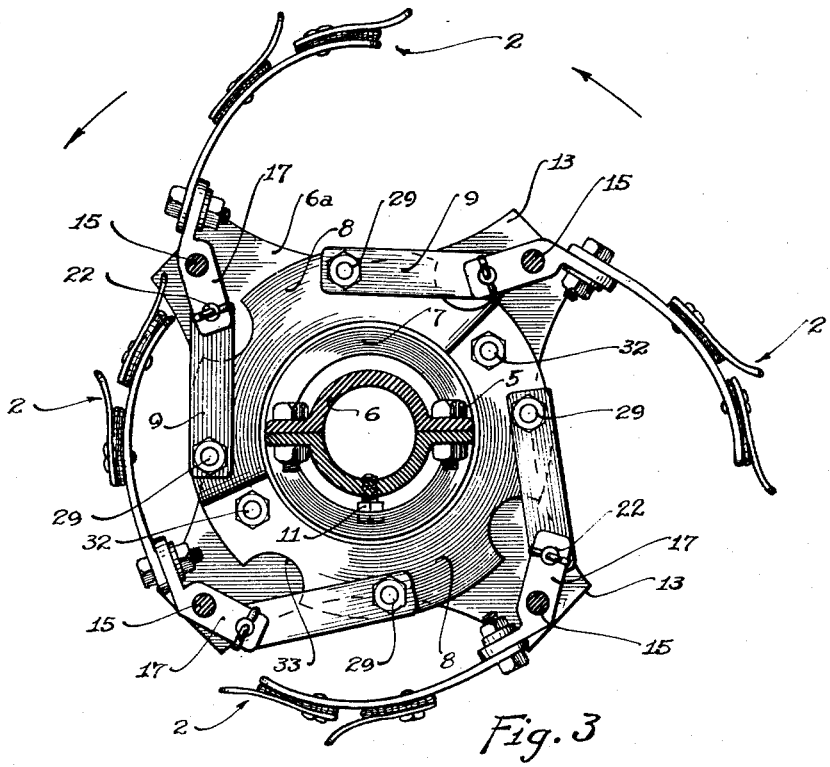
Fig. 3 is a sectional view similar to Fig. 1, but showing the beaters in a different position.

Figure 3 indicates the limitation of independent play of the several beater arms, which limit is constant at all positions. The upper right hand beater arms of Figure 3 are in extended position, the other two beater arms in closed position. As will be seen, the several beater arms are permitted this limit of play without affecting the position of the other beater arms.

What is claimed is:

1. In a carcass dehairing machine, a rotary carrier, a plurality of retractable beater arms and scraper blades mounted on said beater arms, said beater arms being pivotally mounted on the carrier and arranged to swing freely through centrifugal action to engage a carcass.

2. In a carcass dehairing machine, a rotary carrier, a plurality of rigid beaters pivotally mounted on the carrier and arranged to swing outwardly freely through centrifugal action to engage a carcass, and pressure transference means for operatively connecting the beaters to one another.

3. In a carcass dehairing machine, a rotary carrier, a plurality of metal beaters pivotally mounted on the carrier and arranged to swing outwardly freely through centrifugal action to engage a carcass, a shiftable member mounted on the carrier, and means for connecting each of the beaters with the shiftable member.

4. In a carcass dehairing machine, a rotary carrier, a plurality of metal beaters pivotally mounted on the carrier and arranged to swing outwardly freely through centrifugal action to engage a carcass, and a shiftable ring mounted for reverse rotary movement on the carrier and connected with each of the beaters.

5. In a carcass dehairing machine, a rotary carrier, a plurality of metal beaters pivotally mounted on the carrier and arranged to swing outwardly freely through centrifugal action to engage a carcass, a shiftable ring mounted for reverse rotary movement on the carrier, and links connecting the shiftable ring with each of the beaters.

6. In a carcass dehairing machine, a rotary carrier, a plurality of beaters pivotally mounted on the carrier and adapted to swing outwardly through centrifugal action to engage a carcass, said beaters being provided with inwardly extending arms, and a shiftable ring mounted on the carrier for reverse rotary movement and connected with the arms of the beaters.

7. In a carcass dehairing machine, a rotary carrier, a plurality of beaters pivotally mounted on the carrier and adapted to swing outwardly through centrifugal action to engage a carcass, said beaters being provided with inwardly extending arms, a shiftable ring mounted on the carrier for reverse rotary movement and connected with the arms of the beaters, and links pivotally connected with the arms of the beaters and with the ring and connecting each of the beaters with the said ring.

8. In a carcass dehairing machine, a rotary carrier provided with side plates and having a bearing located between the said plates, a plurality of beaters pivotally mounted between the side plates and arranged to swing outwardly through centrifugal force to engage a carcass, and a connecting ring mounted on the said bearing for reverse rotary movement and connected with each of the beaters.

9. In a carcass dehairing machine, a rotary carrier provided with side plates and having a bearing located between the said plates, a plurality of beaters pivotally mounted between the side plates and arranged to swing outwardly through centrifugal force to engage a carcass, a connecting ring mounted on the said bearing for reverse rotary movement and connected with each of the beaters, and links pivotally connected with the beaters and with the said ring and connecting each of the beaters with the ring.

10. In a carcass dehairing machine, a rotary carrier, a plurality of beaters pivotally mounted on the carrier and arranged to swing outwardly through centrifugal action to engage a carcass, said beaters being provided with inner arms, a shiftable ring mounted on the carrier and provided with segmental recesses, and links arranged in pairs and located at opposite sides of the ring and having inner and outer pivots connecting the links with the said arms and with the ring, the segmental recesses being adapted to receive the outer pivots during the swinging movements of the beaters.

11. In a carcass dehairing machine, a rotary carrier consisting of a drum having a hub portion and provided with spaced side flanges and a plurality of retractable beaters pivotally mounted between the side flanges of the drum and arranged to swing through centrifugal action to engage a carcass.

12. In a carcass dehairing machine, a rotary carrier consisting of a sectional drum having a central hub portion and provided with spaced side flanges and having an annular bearing located in the space between the side flanges of the drum, beaters pivotally mounted between the side flanges of the drum and arranged to swing outwardly through centrifugal action to engage a carcass, and a sectional bearing ring mounted on the bearing of the drum and connected with each of the said beaters.

13. In a carcass dehairing machine, a rotary carrier consisting of a sectional drum having a central hub portion and provided with spaced side flanges and having a central annular flange located in the space between the side flanges and forming a bearing, said drum being also provided with transverse abutting webs connecting the central annular flange with the side flanges, fastening devices securing the abutting flanges together, beaters pivotally mounted between the side flanges and arranged to swing outwardly through centrifugal action to engage a carcass, and a sectional bearing ring mounted on the central bearing flange and connected with each of the beaters.

14. In a carcass dehairing machine, a rotary carrier consisting of a drum composed of a central hub portion and spaced side flanges provided with extensions at diametrically opposite points, said drum being also provided between the side flanges with a central annular bearing flange, beaters pivotally mounted between the extensions of the side flanges and arranged to swing outwardly through centrifugal action to engage a carcass, and a connecting ring mounted on the annular bearing flange and connected with each of the beaters.

15. In a carcass dehairing machine, a rotary carrier, a plurality of beaters consisting of inner angle members pivotally mounted at their angles on the rotary carrier and forming inner arms and outer flanges, resilient plates secured to the outer flanges, a shiftable member mounted on the rotary carrier, and means for connecting the shiftable member with each of the arms of the beaters.

16. In a carcass dehairing machine, a rotary carrier, a plurality of beaters consisting of inner angle members pivotally mounted at their angles on the rotary carrier and forming inner arms and outer flanges, the inner arms being provided with bifurcations, resilient plates secured to the said outer flanges, a shiftable ring mounted on the carrier, and links pivoted at one end in the bifurcations of the said arms and at the other end to the said ring.

17. In a carcass dehairing machine, a rotary carrier, a plurality of pivoted beaters mounted on the rotary carrier and arranged to swing outwardly through centrifugal action to engage a carcass, scraper knives carried by the said beaters, and cushioning shims interposed between the scraper knives and the beaters.

18. In a carcass dehairing machine, a rotary carrier, a plurality of beaters pivotally mounted on the carrier and provided with curved resilient plates having inwardly tapered recesses at their outer ends, and scraper blades mounted on the said plates at opposite sides of the tapered recess.

JOHN J. GONSOR.